July 24, 1962 G. PRETINI 3,045,775
PROTECTION SYSTEM FOR VEHICLES CARRYING VALUABLES
Filed March 30, 1960 2 Sheets-Sheet 1

INVENTOR:
GISBERTO PRETINI
By
Richardson, David and Nardon
ATTY'S.

July 24, 1962 G. PRETINI 3,045,775
PROTECTION SYSTEM FOR VEHICLES CARRYING VALUABLES
Filed March 30, 1960 2 Sheets-Sheet 2

INVENTOR:
GISBERTO PRETINI
By
Richardson, David and Nordon
Attys.

United States Patent Office 3,045,775
Patented July 24, 1962

3,045,775
PROTECTION SYSTEM FOR VEHICLES
CARRYING VALUABLES
Gisberto Pretini, S. Frediano a Settimo, Pisa, Italy, assignor of one-half to Compagnia Italiana Westinghouse Freni e Segnali, Turin, Italy, an Italian corporation
Filed Mar. 30, 1960, Ser. No. 18,576
Claims priority, application Italy Apr. 6, 1959
10 Claims. (Cl. 180—82)

The present invention relates to an anti-robbery protection apparatus suitable for installation on vehicles which carry valuables.

It is known to surround the storage room of a vehicle with an auxiliary wall containing fluid under pressure and connected by pipes to valves which control a suitable defense and alarm apparatus.

Such apparatus is automatically operated upon a decrease in fluid pressure due to a rupture in any point of the surrounding wall, upon an undesired opening of the entrance doors of the vehicle, upon a variation of the load imposed on the seat of the driver's cab, or by actuation of any other means which may cause discharge of the fluid under pressure contained in the surrounding wall.

This invention has for its main object to provide an improved apparatus of the kind described, easily applicable to a vehicle, and provided with particular safety and protection features for preventing theft while insuring safety of personnel in the vehicle.

An important feature of the invention resides in provision of an alarm which operates simultaneously with automatic closing of a storage room door as soon as an external entrance door is opened.

Another feature of the invention is the provision of means for dividing the storage room for valuables into a plurality of compartments each closed by a door.

The opening of the compartment doors is dependent upon closing of the others, with a predetermined time delay in a proper sequence between the closing of one door and the opening of another. Any attempt to open simultaneously two doors causes operation of the alarm apparatus.

A further feature of the invention is in the provision of an acoustic alarm means, interlocked with an automatic switch means controlling fuel supply to the engine of the vehicle or controlling ignition of the fuel of same to cause the vehicle to stop.

Other features and advantages of the invention will become more apparent from the following detailed description taken with reference to the drawings in which.

Figure 1:
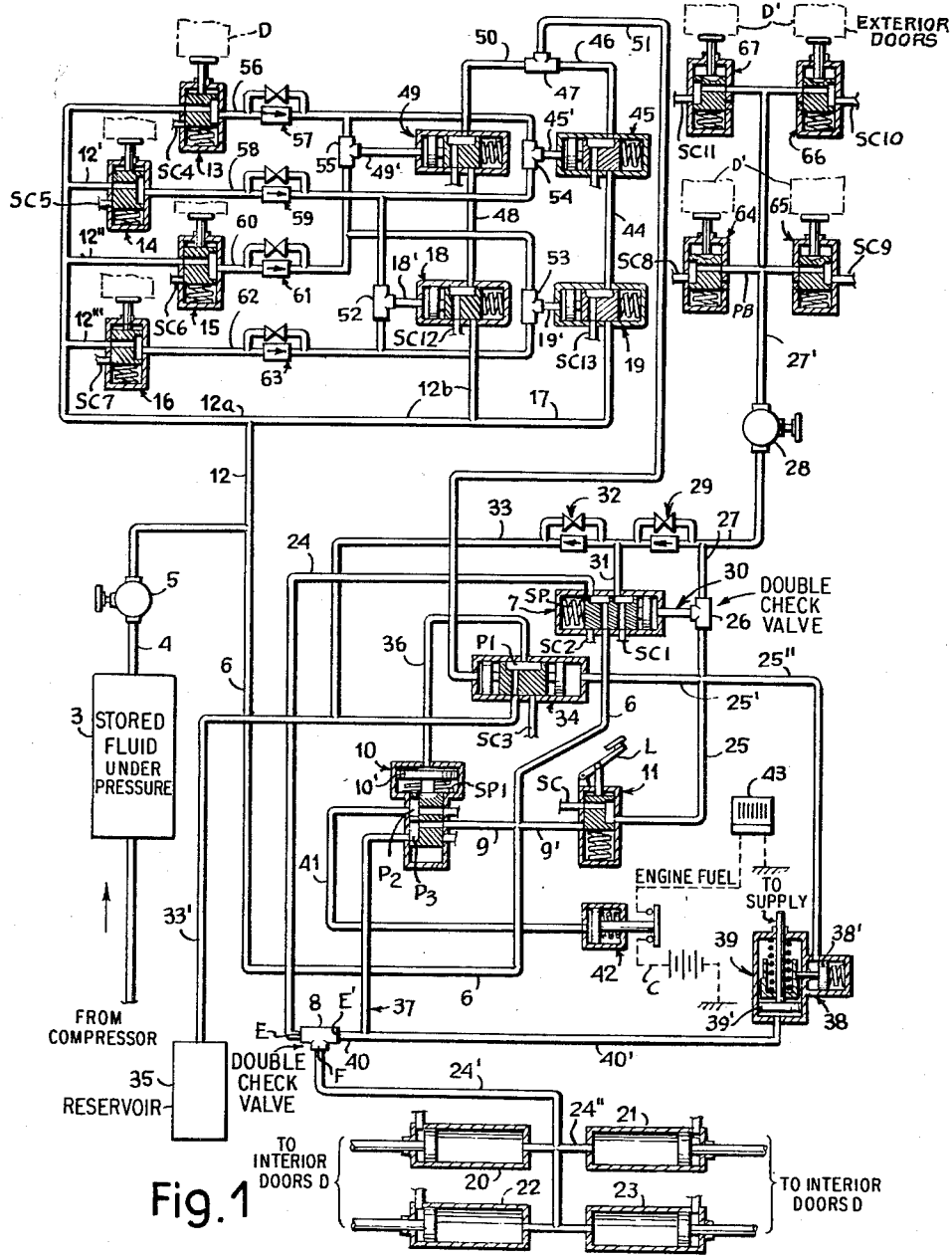
FIG. 1 shows diagrammatically an embodiment of the apparatus intended for installation in a motor vehicle for carrying valuables.

Referring to FIG. 1, there is shown a pneumatic apparatus which comprises a reservoir 3, charged with fluid under pressure at any desired rate, from a compressor not shown in the drawing. During usual charging conditions of the system, the fluid under pressure is applied from reservoir 3 through a pipe 4, a pressure reducing valve 5, and a pipe 6 to a pilot valve 7.

Two pipe branches 9 and 9' of pipe 6 are connected to a relay valve 10 and to a resetting lever valve 11 respectively.

Another pipe branch 12 of pipe 4 is connected by a sub-branch 12a to a button valve 13, and through supplementary branches 12', 12", 12''' to other button valves 14, 15, 16.

The charging and exhaust positions of each of these valves is mechanically controlled by different sliding doors D which close a different storage room or compartment inside of the vehicle. The doors D are indicated diagrammatically by dotted lines in FIG. 1.

The pipe branch 12 is connected via sub-branches 12b to pilot valve 18 and through another pipe branch 17 to a pilot valve 19.

The pilot valve 7 can supply or exhaust the fluid under pressure to and from actuators 20, 21, 22, 23 connected to the storage room doors D, through pipe 24, one end of a double check valve 8, a pipe 24' and connecting pipe branches 24" to each actuator. This controls the closure operation of the door D' to which it is mechanically connected in any suitable way, not shown in the drawing.

The resetting lever valve 11 is connected through a pipe 25 to one end of a double check valve 26, while the opposite end of the latter is connected by a pipe 27 to an isolating cock 28 and a check valve with choke 29.

The central fitting of the double check valve 26 is connected, through a pipe 30, to the above mentioned pilot valve 7.

Valve 7 is in turn connected through a pipe 31 to two check valves with chokes 29 and 32.

Check valve 32 is connected through pipes 33, 33' to a transfer valve 34 and to a small timing reservoir 35.

Transfer valve 34 is in turn connected through a pipe 36 to the control chamber of relay valve 10.

A pipe branch 25" of pipe 25 is connected to a small cylinder 38, acting to engage and disengage another cylinder 39 which controls fuel supply to the engine of the vehicle; another pipe branch 25' is connected to one of two control chambers of the transfer valve 34.

The relay valve 10 is connected through piping 37, 40 leading to one end of the double check valve 8, to the actuators 20-23 operating the recess doors, through a pipe branch 40' to the cylinder 39 controlling the fuel supply to the engine of the vehicle and through a pipe 41 to pneumatic switch 42 which operates to close or open an electric circuit C controlling an alarm siren 43.

The pilot valve 19 is connected through a pipe 44 to a similar pilot valve 45. Valve 45 is connected through a pipe 46 to one end of the double check valve 47.

The pilot valve 18 is connected through a pipe 48 to a similar pilot valve 49 connected in turn through a pipe 50 to the other end of the double check valve 47. The central fitting of this valve is connected through a pipe 51, to one of the control chambers of the transfer valve 34.

The control chamber of each of the pilot valves 18, 19, 45 and 49 is connected through an associated pipe 18', 19', 45' and 49' to the central fitting of each of the corresponding double check valves 52, 53, 54, 55.

The button valve 13 is connected through a pipe 56 and a check valve with choke 57 to one end of each of the double check valves 55 and 54.

The button valve 14 is connected through a pipe 58 and a check valve with choke 59 to one end of each of the double check valves 52 and 54.

The button valve 15 is connected through a pipe 60 and a check valve with choke 61 to one end of each of the double check valves 55 and 53.

Button valve 16 is connected through a pipe 62 and a check valve with choke 63 to one end of each of the double check valves 52 and 53.

It is here to be noted that all the double check valves 8, 26, 47, and 52–55 in the apparatus allow the flow through their central fitting F of the fluid under pressure entering from either end E or E' while cutting off the other inoperative end.

An isolating cock 28, depending on whether it is open or closed, supplies or exhausts the fluid under pressure in a pipe 27' which, through suitable pipe branches PB is connected to the control chamber of each button valve 64, 65, 66, 67. These valves are mechanically operated by the closing and opening movements of the outside doors D' of the vehicle.

The operation of the above described apparatus is as follows:

*Charging and Resetting of the System*

Let us suppose that the alarm apparatus be inoperative and the fluid under pressure in reservoir 3 flows out at a predetermined rate. It will be apparent that under these conditions the reservoir supplies the valves 7, 10, 11, 13, 14, 15, 16, 18, 19, through the several pipes and pipe branches above specified in detail.

To render operative the alarm apparatus, it is first of all necessary to push down the operating lever L of valve 11, so that a connection be established between the supply pipe 9' and pipe 25. Pipe 25 which has previously been exhausted to atmosphere through the vent port SC of the valve is now closed.

The fluid under pressure arrives thereby to one end of the double check valve 26, then through its central fitting and pipe 30, enters in the control chamber of the pilot valve 7. The valve core moves to the left as shown in FIG. 1 and establishes a direction connection between the supply pipe 6 and pipe 31, cutting off right vent port SC1 and exhausting the actuators 20, 21, 22 and 23 through pipe 24' and 24", double check valve 8, pipe 24 and left vent port SC2 of valve 7.

Simultaneously, the fluid arrives under pressure through the pipe branch 25' to one end of the transfer valve 34 and operates this valve to establish a direct connection between pipe 33' and pipe 36, cutting off at the same time its vent port SC3.

Through the branch pipe 25", the fluid under pressure arrives also to the small cylinder 38 and retracts piston 38', disengaging piston 39' in cylinder 39, which was previously locked in a position. Piston 39' moves axially allowing fuel to flow to the engine of the vehicle.

At the same time, the fluid under pressure arrives through the connection now established between pipe 6 and pipe 31, at the check valve with choke 32 and pipe 33 to port P1 of the transfer valve 34 and to pipe 36 leading to the control chamber of relay valve 10.

Piston 10' in valve 10 is moved by the fluid under pressure in pipe 9 to its lower position, thus opening port P2 supplying pipe 41 leading to the pneumatic switch 42. Switch 42 is operatively connected to the alarm siren 43. The fluid exhausts through the lower vent port P3 the pipe 37 and pipe branches 40—40' which are connected to the door actuators 20, 21, 22, 23 and to the control chamber of cylinder 39 which operates the fuel pump of the vehicle engine.

A pipe branch 33' of pipe 33 leads the fluid under pressure to the small reservoir 35.

Pipe 31, through the choke in check valve 29, pipe 27 and pipe branch 30 connected to the double check valve 26, supplies fluid to the control chamber of pilot valve 7.

It is now appropriate to point out that in the above described charging conditions of the apparatus, one can freely release the lever L of the resetting valve 11, which will assume again the raised position shown in the drawing, i.e. of opening pipe 25 and connected pipe branches 25' and 25" to the atmosphere through vent pipe SC.

Such action will not affect the system, as the pilot valve 7 is maintained in the supply position of pipe 31 by the self controlling auxiliary circuit through the choked passage in check valve 29 and the connected end of double check valve 26. The end of valve 26 connected to pipe 25, now open to exhaust, is cut-off.

While the pilot valve 7 is maintained in the above described supply position of pipe 31, the fluid under pressure flows also to the control chamber of relay valve 10, through the passage located in the transfer valve 34 at port P1 between the pipes 33 and 36.

The pilot valve 7, the transfer valve 34 and the relay valve 10 remain in the position described hereinbefore, independently by the fact that pipe 25 now leads to exhaust through vent port SC of valve 11.

With the apparatus charged and positionally arranged as above described in detail, it is now necessary to connect the pneumatic system to the button valves 64, 65, 66, 67, mechanically controlled by the vehicle doors D', which, according to their closed or open positions, maintain the alarm system in inoperative or operative condition.

At this stage it is necessary to close the external vehicle doors D'. Such action must be accomplished after entrance of the service personnel into the vehicle. Upon the closing of the four doors D each covering an inside storage compartment, the corresponding button valves 13, 14, 15, and 16 will cut off their supply pipes 12, 12', 12", 12"', from control pipes 56, 58, 60, 62 which are opened to atmosphere through the vent ports SC4, SC5, SC6, SC7 of said valves.

In the above described conditions in which the inside storage compartment doors D and external doors D' are closed, the resetting of the apparatus for operating the alarm system must be effected by the manual opening of the isolating cock 28.

This action will establish a connection between pipes 27, 27' and associated pipe branches which supply the button valves 64, 65, 66, 67, which, when the doors D' are closed, cut-off their vent ports SC8, SC9, SC10, SC11 from the supply pipes.

The pneumatic apparatus is now fully set up and the vehicle is ready for travelling.

*Examples of Automatic Operation of the Alarm System*

The first example involves an undesired opening of any of the external access doors D' due to any cause, as for example, an attempted theft while the vehicle is moving or stationary.

The opening of an external door D' causes the mechanical operation of the corresponding button valve 64, 65, 66, or 67, thus exhausting to atmosphere through vent port SC8—SC11, the fluid under pressure in pipes 27' and 27.

The fluid under pressure in the control chamber of pilot valve 7, will be immediately exhausted to atmosphere through pipe 30, and the double check valve 26 connected to pipe 27. This occurs because a pressure differential is created across the check valve 29, which, through the relatively small flow capacity of its choke, cannot supply fluid at a sufficient pressure rate to the control chamber opened to atmosphere through pipes 27—27' and the vent ports SC8—SC11.

The return spring SP included in the pilot valve 7 moves the valve core to its release position in which pipe 31 is cut-off from supply pipe 6 and exhausted, while pipe 24 is cut-off from the exhaust and supplied with fluid under pressure from pipe 6.

The actuators 20, 21, 22 and 23 of interior doors D are therefore supplied with fluid from pipe 6, through pipe 24, double check valve 8 and pipe 24', and the doors D are thereby locked in their closed position.

At the same time exhaust to atmosphere of pipe 31, caused by return of the pilot valve 7 to release position, causes the exhaust of pipes 33—33' as well as of the reservoir 35, but with a certain delay, through the choke in check valve 32 and pipe 36 connected to pipe 33 through the transfer valve 34 and leading to the control chamber of the relay valve 10.

When the pressure in valve 10 decreases to a predetermined level, the return spring SP1 of the relay valve will bring its valve assembly to the release position.

In this position of the relay valve 10, pipe 41, which is connected to the pneumatic switch 42 controlling the alarm siren 43, is exhausted, thus causing energization of the electrical circuit operating the siren.

At the same time the pressure pipe 9 is connected to pipe 37, thus supplying through this last and pipe 40', the cylinder 39 which cuts off the fuel supply to the engine. The engine will then be stopped or will be locked if the vehicle is at rest.

It is now appropriate to point out that the operation of the above described protection and alarm system is delayed for a predetermined time by the fact that the return to release position of the relay valve 10 depends upon the rate of exhaust of the fluid under pressure in its control chamber and rate of exhaust of the pressure in reservoir 35 through the choke in check valve 32, pipe 31 and vent port SC1 of valve 7.

Such a predetermined time delay allows the occupants of the vehicle to leave safely, thereby avoiding a possible armed attack by thieves.

In any case, even if the vehicle is started again, it cannot travel more than a short predetermined distance when the engine will stop and automatic operation of the alarm siren and closing of the doors will occur as described.

There will now be described operation of the alarm apparatus in different situations involving opening and closing of the internal storage compartment doors, when upon arrival of the vehicle at its destination, the protection apparatus is renderd inoperative against opening of external doors D', by closing of the isolating cock 28.

Suppose that the four sliding doors D are closed.

Each door D operates mechanically one of the button valves 13, 14, 15, 16 which in this position maintains one of operating pipes 56, 58, 60, 62 open to atmosphere through vent ports SC4–SC7.

Let us now suppose one of the doors D is opened, by way of example, that door D acting on button valve 16. As a result a passage will be established between supply pipe 12''' and the operating pipe 62.

The fluid under pressure, passing through the check valve 63, arrives simultaneously at double check valves 52 and 53, then, through these valves, enters into the control chamber of each pilot valve 18 and 19. Valves 18 and 19 are then operated to establish a direct connection between their supply pipes 12b and 17 and pipes 48 and 44 leading respectively to the pilot valves 49 and 45.

The release position of valves 45 and 49 is not changed and the alarm apparatus remains inoperative if the closing and opening of the doors is effected according to a pre-established sequence, as will be apparent from the following description.

Suppose now that one of doors D previously opened is closed, this action will result in the return of the button valve 16 to the exhaust position of pipe 62 and connected control chambers of the pilot valves 18 and 19, through the choke of a relatively small flow capacity in check valve 63, with a certain time delay determined by the exhaust rate of the pressure through the choke. This exhaust rate depends on the capacity of the pipe and chambers connected to the choke between the check valve 63 and pilot valves 18 and 19.

If, after this elapsed time, another interior door is opened, for example that one which controls the button valve 13, the above described operation will be repeated; i.e. the corresponding operating pipe 56 will be supplied with fluid under pressure from pipe 12, through the connection established by button valve 13, then through check valve 57 and pipe branches of pipe 56 connected to one end of the double check valves 55 and 54, and into the control chamber of pilot valves 49 and 45. Both these valves 45 and 49 will be operated so as to establish a connection among the associated pipes 48, 50 and 44, 46.

In the above operative conditions, pipes 48 and 44 which supply pilot valves 49 and 45 are opened to the atmosphere through the vent ports SC12, SC13 of the pilot valves 18 and 19. Pipe 51 is maintained exhausted so that the alarm apparatus remains inoperative.

As will be apparent from the drawing, the above described operation will be repeated when after a short time delay one or another of the doors D associated with valves 14 and 15 is operated. Valves 14 and 15 are connected to the pipes 58 and 60 which supply or exhaust the fluid under pressure into the control chambers of the pilot valves 18 and 45 (connected to pipe 58) and the control chambers of the pilot valves 49 and 19 (connected to pipe 60) through valves 59, 61 and valves 52, 54.

Suppose now that an unauthorized attempt is made to open simultaneously two or more interior doors, for example, the ones which operate the button valves 16 and 13.

In this situation, the fluid pressure supplied in the pipe 62 arrives at the same time into the control chambers of the pilot valves 18 and 19 and operates these valves to establish through them a connection between their supply pipes 12 and 17 and pipes 48 and 44, respectively, connected to the pilot valves 49 and 45.

At the same time, the control chambers of these pilot valves are supplied through the operating pipe 56 and the double check valves 55 and 54. Both pilot valves 45 and 49 will establish a connection between their associated pipes 48 and 44 and the pipes 50 and 46, each connected to one of the two opposite ends of the double check valve 47, thus supplying pipe 51 connected to one end of the transfer valve 34.

The fluid under pressure entering into the control chamber of the valve to which is connected pipe 51 operates transfer valve 34 so that it assumes the open position to atmosphere through the vent port SC3. Pipe 36 then exhausts the pressure in the control chamber of the relay valve 10.

Valve 10 will then take up again the release position shown in the drawing in which the door actuators 20, 21, 22 and 23 are supplied with fluid under pressure from pressure pipe 9 through pipes 37 and 40, and double check valve 8 and pipe 24'. The doors will become locked in their closed position. At the same time fluid under pressure arrives through pipe 40' into the control chamber of cylinder 39 which is thereby operated to cut-off the fuel supply to the engine, and preventing the engine from starting if the motor vehicle is stationary.

Also pipe 41 which is connected to the pneumatic switch 42 operates the alarm siren 43 by opening to atmosphere and cutting in the energizing circuit of the siren.

The alarm system is operated and locking of the internal doors D is caused, as above described, in connection with the undesired opening of the external entrance doors D' of the vehicle.

A similar action, with automatic operation of the alarm apparatus, will be obtained if one tries to open simultaneously any two interior doors mechanically controlling the button valves 14—16 as will be clear from the pneumatic circuits shown in the drawing and the above description.

In any of these situations the transfer valve 34 will always be operated by the fluid under pressure supplied in pipe 51 from the double check valve 47 with consequent automatic operation of the alarm and safety system.

It should now be noted that the alarm means is also operated if, during a closing movement of an interior compartment the predetermined time delay has not elapsed, as required to allow the complete exhaust to atmosphere through the operative one of check valves 57, 59, 61, 63 and through through the vent ports SC4–SC7 of the button valve connected thereto.

Upon an undesired opening of another interior door one of the operative pipes 56, 58, 60, 62 and the control chamber of a further pilot valve is supplied with fluid under pressure. This establishes a continuous circuit up to the double check valve 47. The control chamber of the pilot valve becomes inoperative as fluid pressure is maintained in the pilot valve.

It is also to be noted that in all the above described situations of undesired closing of an interior compartment door or simultaneous opening of two such doors, the operation of the alarm system, the locking of all the interior compartment doors and cutting off of the fuel supply to the engine occurs immediately, as the transfer valve 34 will exhaust the pipe 36 through port SC3 and cutting off pipe 33' and the fluid reservoir 35.

Figure 2:
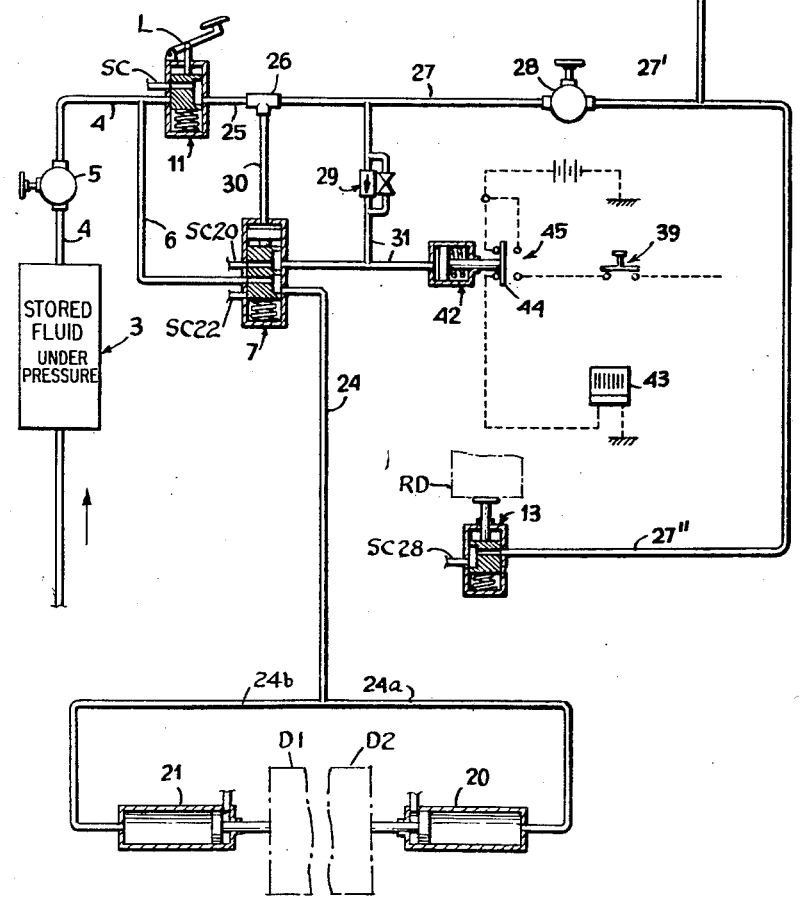
FIG. 2 shows diagrammatically a simplified embodiment of the invention, intended for a motor vehicle provided with an entrance from the outside to a single storage room closed by two sliding doors.

Referring now to the layout of apparatus shown in FIG. 2, it will be noted that there is illustrated therein a simplified embodiment covering an apparatus similar to that of FIG. 1 insofar as concerns the main components. In this embodiment, the motor vehicle is provided with two external access doors SD and one rear door RD. These doors afford entrance to a single interior compartment closed by two sliding doors D1, D2. The vehicle may be provided with a gasoline engine.

In the following description, for more clarity, the same numerals are used for the corresponding devices and pneumatic circuits as described with reference to FIG. 1.

*Charging and Resetting of the System*

Let us suppose that the alarm means 43 be inoperative and the fluid pressure in reservoir 3 is set at a certain magnitude. Under these conditions the reservoir 3, through pipe 4 and the reducing valve 5, supplies the resetting valve 11, and through the pipe branch 6, supplies the pilot valve 7. Valve 7 supplies pipe 24 and pipe branches 24a, 24b connected to the actuators 20 and 21, each of which operates a sliding door D1 or D2 to which it is mechanically connected, forcing it to a closing position.

At the same time, pipe 31 connected to the control chamber of the pneumatic switch 42 is opened to atmosphere through the upper vent port SC20 of pilot valve 7.

In order to operate the alarm system 43, it is now necessary to push down the operating lever L of the resetting valve 11, which establishes a connection between the supply pipe 4 and the pipe 25. Fluid is supplied through one end of the double check valve 26 and the pipe 30 to the control chamber of the pilot valve 7 which is thereby operated so as to establish a direct connection between supply pipe 6 and pipe 31.

Pipe 31 supplies pressure to the pneumatic switch 42 which is operated and closes the contacts 45 of contactor 39 which controls the engine ignition means. Switch 42 at the same time opens contacts 44 which control the siren 43.

At the same time, through its lower exhaust port SC22, the pilot valve 7 exhausts to atmosphere the pressure previously supplied in the pipe 24 and pipe branches 24a, 24b and door actuators 20 and 21.

Pipe 31, through the check valve 29 and pipe 27 connected to the other end of the double check valve 26, supplies through an auxiliary pneumatic circuit, the control chamber of pilot valve 7, maintaining it in the above described lower position, even after the control lever L of the resetting valve 11 has been released.

With the apparatus charged with fluid under pressure and in the above described operative conditions, the pneumatic system must now be connected to the button valves 64, 65 and 13, the first two mechanically operated by the external side doors SD of the vehicle, the third by the external rear door RD.

The external doors when closed maintain inoperative the alarm system, but the alarm system is operative in case of an undesired opening of one of the doors.

At this point it is necessary to close the three external doors. This operation must be accomplished after the service personnel are on the vehicle.

In the above described conditions, the system is charged with fluid under pressure and external doors are closed. The resetting of the apparatus for automatic operation of the alarm system must be completed by opening of the isolating cock 28 by the authorized personnel in the vehicle.

The opening of this cock establishes a connection between pipes 27 and 27' which supply fluid under pressure to the button valves 64, 65 and 13. The vent ports SC24, SC26, SC28 of these valves are cut off from the supply pipe when doors SD and RD are closed.

The pneumatic and alarm apparatus is therefore completely reset and the vehicle ready to start.

*Automatic Operation of the Alarm System*

In the system of FIG. 2 the undesired opening of one of the external doors, caused for instance by an attempt of robbery from unknown persons, causes operation of the alarm system.

The opening of any of the external doors operates mechanically the associated button valve 64 or 65 or 13, which opens to exhaust into atmosphere, through its vent port SC24, SC26 or SC28, the fluid under pressure in pipes 27—27' —27" and apparatus connected thereto.

Consequently, the fluid under pressure in the control chamber of the pilot valve 7 will be immediately exhausted to atmosphere through: pipe 30, double check valve 26, pipe 27, isolating cock 28, pipe 27' and the vent port of one of the button valves operated by the open door.

The valve 7, owing to the reaction of its return spring, moves again to exhaust the pipe 31 and the pneumatic switch 42 through its upper vent port SC20, reestablishing at the same time the connection betwen the supply pipe 6 and pipe 24 and branches 24a, 24b, with the result that fluid is supplied under pressure to the actuators 20 and 21 of doors D1, D2.

Upon occurrence of this action the internal sliding doors D1, D2 will be immediately closed and the alarm siren 43 will be operated by closing electrical contacts 44 as switch 42 is operated. Contacts 45 will open to open the engine starting circuit 39.

Of course, the invention is not intended to be limited to the two particular embodiments shown schematically in FIGS. 1 and 2 of the drawings, but is subject to changes and alterations within the objects of the invention described.

For instance the number of internal storage compartments may be varied and the actuators operating the internal doors may also operate, upon automatic operation of the alarm apparatus, any suitable defense means such as a smoke discharger or the like.

What I claim is:

1. A protection system for a vehicle having an interior storage compartment for valuables, an internal door in the vehicle closing said storage compartment, and an external door on the vehicle providing access to the internal door, said vehicle having an engine and fuel supply therefor, comprising a plurality of valves interconnected by pipes in a pneumatic circuit, a pneumatic actuator device operatively disposed to close and lock said internal door and connected to said circuit, one of said valves being disposed for actuation by opening of the external door, a pneumatic switch connected to said circuit, an alarm operatively connected to said switch for actuation thereby, means for controlling supply of fuel to the engine operatively connected to said circuit, and a source of fluid under pressure connected to said circuit, said one valve being operatively disposed in said circuit to control flow of said fluid to said device, switch, and the fuel supply control means, whereby opening of the external door while said fluid is supplied under pressure to said circuit actuates the one valve so that the pneumatic switch, the fuel supply control means, and said pneumatic actuator device are actuated to activate the alarm, to cut off the supply of fuel from the engine, and to close and lock the internal door.

2. A protection system for a vehicle having an interior storage compartment for valuables, an internal door in the vehicle closing said storage compartment, and an external door on the vehicle providing access to the internal door, said vehicle having an engine and fuel supply therefor, comprising a plurality of valves interconnected by pipes in a pneumatic circuit, one of said valves being disposed for actuation by opening of the internal door, a pneumatic switch connected to said circuit, an alarm operatively connected to said switch for actuation thereby, means for controlling supply of fuel to the engine operatively connected to said circuit, and a source of fluid under pressure connected to said circuit, said one valve being operatively disposed in said circuit to control flow of said fluid to said switch and to the fuel supply control means, whereby opening of the internal door while said fluid is supplied under pressure to said circuit actuates the one valve, the pneumatic switch and the fuel supply control means, whereby the alarm is activated and the supply of fuel is cut off from the engine.

3. A protection system for a vehicle having a plurality of internal storage compartments for valuables, a plurality of internal doors in the vehicle respectively closing the storage compartments, and a plurality of external doors on the vehicle providing access to the internal doors, said vehicle having an engine for fuel supply therefor, comprising a plurality of valves interconnected by pipes in a pneumatic circuit, a plurality of pneumatic actuator devices disposed to close and lock the internal doors respectively, said devices being connected to said circuit, certain of said valves being disposed for actuation by opening of any of the external doors, a pneumatic switch connected to said circuit, an alarm operatively connected to said switch for actuation thereby, means for controlling the supply of fuel to the engine operatively connected to said circuit, and a source of fluid under pressure connected to said circuit, whereby said certain valves being operatively disposed in said circuit to control flow of said fluid to said devices, switch, and the fuel supply control means, whereby opening of any one of the external doors while said fluid is supplied under pressure to said circuit actuates at least one of said valves, the pneumatic switch, the fuel supply control means and said pneumatic actuator devices, whereby the alarm is activated, the supply of fuel is cut off from the engine, and all the internal doors are closed and locked.

4. A protection system according to claim 3, further comprising a time delay device in said circuit operatively associated with said switch to delay activating of the alarm for a predetermined time after opening of one of the external doors.

5. A protection system for a vehicle having a plurality of internal storage compartments for valuables, a plurality of internal doors in the vehicle respectively closing the storage compartments, and a plurality of external doors on the vehicle providing access to the internal doors, said vehicle having an engine for fuel supply therefor; comprising a plurality of valves interconnected by pipes in a pneumatic circuit, certain of said valves being disposed for actuation by opening of any one of the internal doors, a pneumatic switch connected to said circuit, an alarm operatively connected to said switch for actuation thereby, means for controlling supply of fuel to the engine operatively connected to said circuit, and a source of fluid under pressure connected to said circuit, said certain valves being operatively disposed in said circuit to control flow of said fluid to said switch and to the fuel supply control means, whereby opening of any one of the internal doors while said fluid is supplied under pressure to said circuit actuates an associated one of said certain valves, the pneumatic switch and the fuel supply control means, whereby the alarm is activated and the supply of fuel is cut off from the engine.

6. A protection system according to claim 5, further comprising time delay means in said circuit operatively associated with said certain valves, and a fluid pressure release device in said circuit, whereby each of the internal doors may be opened in succession only after expiration of predetermined delay times following actuation of the fluid pressure release device, and whereby forced opening of an internal door prior to expiration of the predetermined delay time activates the alarm.

7. A protection system according to claim 5, wherein others of said valves are check valves and pilot relay valves operatively associated with said certain valves to control said pneumatic switch and the fuel supply control means, whereby simultaneous opening of any two internal doors activates the alarm and cuts off supply of fuel to the engine.

8. A protection system according to claim 5, wherein others of said valves are check valves and pilot relay valves operatively associated with said certain valves to control said pneumatic switch and the fuel supply control means, whereby simultaneous opening of any two internal doors activates the alarm and cuts off supply of fuel to the engine, and further comprising time delay means in said circuit operatively associated with said certain valves, and a fluid pressure release device in said circuit, whereby each of the internal doors may be opened in succession only after expiration of predetermined delay times following actuation of the fluid pressure release device, and whereby forced opening of an internal door prior to expiration of the predetermined delay time activates the alarm.

9. A protection system according to claim 5, wherein one of said valves is a reset valve and another of said valves is a pilot valve, the reset valve controlling supply of fluid under pressure to the pilot valve, further ones of said valves being pressure exhaust valves respectively associated with the external doors for actuation thereby when any external door is opened, and further comprising pneumatic actuator devices in said circuit disposed to close and lock the internal doors, whereby opening of any one of the external doors actuates an exhaust valve and sets the pilot valve to operate said switch for activating the alarm, actuates the pneumatic actuators to close and lock the internal doors and actuates the fuel supply control means to cut off supply of fuel to the engine.

10. A protection system according to claim 9, wherein others of said valves include a pressure transfer valve operated by the reset valve, a check valve with choke, and a relay valve, and further comprising a reservoir in said circuit for fluid under pressure controlled by said check valve, said transfer valve being operatively associated with said reservoir, said relay valve being operatively associated with said pneumatic switch and said fuel supply control means to actuate the same, said reservoir, transfer valve and check valve cooperating to provide a time delay means for permitting only one internal door at a time to be opened in a predetermined timed sequence.

References Cited in the file of this patent
UNITED STATES PATENTS

| | | |
|---|---|---|
| 655,834 | Rough | Aug. 14, 1900 |
| 1,027,978 | Bellamore | May 28, 1912 |
| 2,709,610 | Chandler | May 31, 1955 |

FOREIGN PATENTS

| | | |
|---|---|---|
| 670,787 | France | Aug. 24, 1929 |